April 11, 1933. R. G. BATESON 1,903,617
HYGROMETER
Filed Sept. 16, 1931 2 Sheets-Sheet 1

INVENTOR
Richard Gordon Bateson
BY
C. Barnard Burdon
ATTORNEY

April 11, 1933. R. G. BATESON 1,903,617
HYGROMETER
Filed Sept. 16, 1931 2 Sheets-Sheet 2

INVENTOR
Richard Gordon Bateson
BY
C. Barnard Burdon
ATTORNEY

Patented Apr. 11, 1933

1,903,617

UNITED STATES PATENT OFFICE

RICHARD GORDON BATESON, OF PRINCES RISBOROUGH, BUCKS, ENGLAND

HYGROMETER

Application filed September 16, 1931, Serial No. 563,075, and in Great Britain September 17, 1930.

This invention relates to hygrometers, and has for its object to provide an improved form of hygrometer of the wet and dry bulb thermometer type in which the relative humidity is given as a direct reading.

The improved direct reading hygrometer which constitutes the present invention is based upon the principle of the nomogram or alignment chart and comprises one member moving in a guide by amounts which are functions of the dry bulb temperature, another member moving in a guide in the opposite direction by amounts which are functions of the wet bulb temperature, and a link connected to each member and determining the humidity reading by its intersection with a curve.

When referring to "moving in the opposite direction" I means that one member moves in one direction for a rise in temperature and the other in the opposite direction for a rise in temperature, but both members are of course capable of movement in both directions according to whether the temperatures are rising or falling.

Referring to the accompanying drawings which illustrate the invention—

Figure 1:
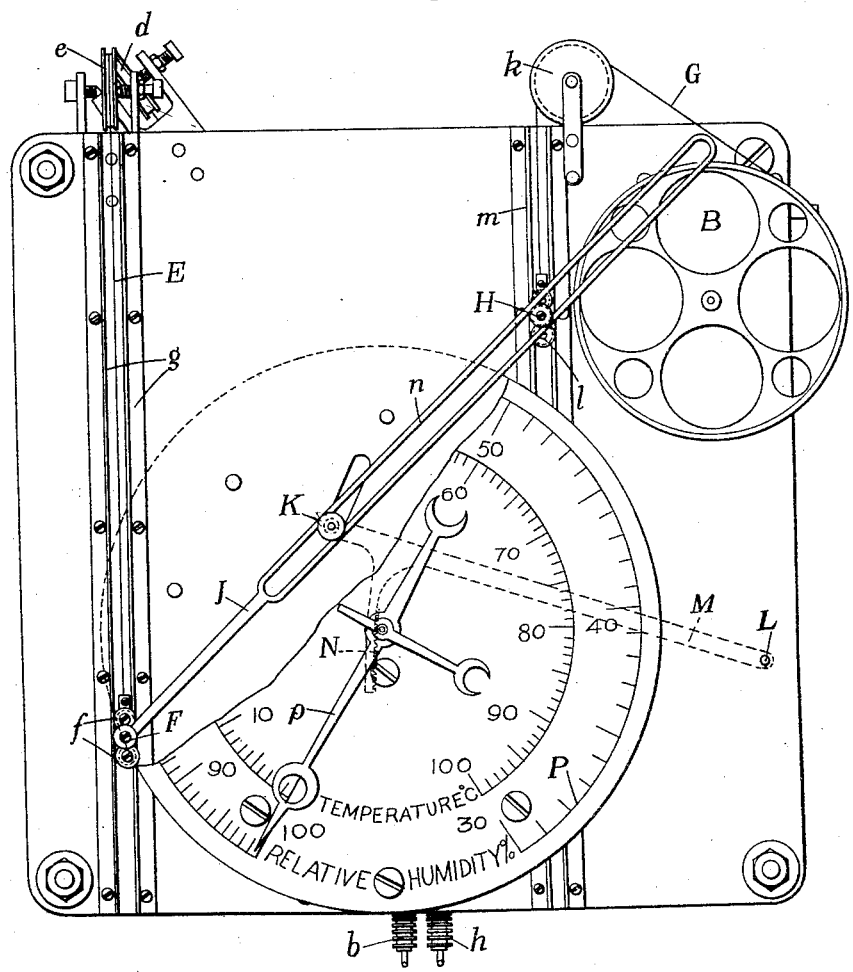
Figure 2:
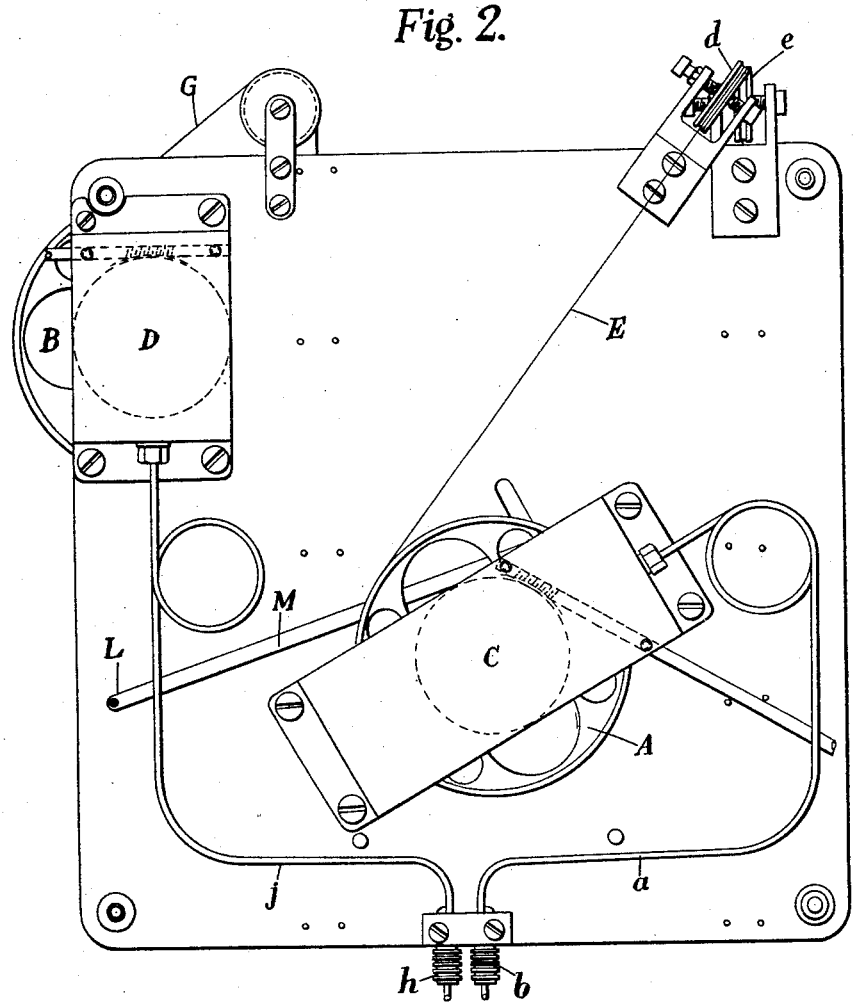

Fig. 1 represents a front elevation of a preferred form of direct reading hygrometer embodying the invention, Fig. 2 represents a rear elevation thereof.

In the form illustrated, the bulbs of the wet and dry bulb thermometers are connected to thin steel tubes of the Bourdon type and the bulbs and tubes are filled with mercury, the expansion and contraction of the mercury causing the closed end of the Bourdon tubes to move in and out, this movement being converted into rotary movement as is well known in pressure and vacuum gauges and automobile radiator thermometers.

The dry bulb thermometer C, which is connected by a pipe $a$ and a nipple connection $b$ to the dry bulb, has a disk A on the rear of the apparatus, which disk is caused to partake of angular movement about its axis by changes of dry bulb temperature.

This disc A is connected by a flexible cable E with a carriage $f$ movable between vertical guides $g$ on the front of the apparatus and runs over guide pulleys $d$, $e$ in passing from back to front. The wet bulb thermometer D has a disc B on the front of the apparatus and is connected by a pipe $j$ and a nipple $h$ to the wet bulb; the disc B is connected by a cable G (which passes over a pulley $k$) to a carriage $l$ moving between vertical guides $m$.

The carriage $f$ has pivoted thereto a link J which has a slot $n$ passing over a wheel H carried by the carriage $l$. The link J engages a pivot K carried by a lever M pivotally anchored at a point L and carrying a rack N engaging a pinion carried by a pointer $p$ provided with a hair spring or like backlash-preventing means.

The thermometer discs A, B are so arranged that an increase of dry bulb temperature causes the carriage $f$ to rise in its guide, while an increase in wet bulb temperature causes the carriage $l$ to move downwards in its groove.

The position of the point K therefore depends upon the combined effects of both movements.

If a series of readings representing different humidities be taken, and a straight edge laid across from dry bulb reading to wet bulb reading, it will be found that readings representing a definite humidity intersect at one point, and in this way a humidity curve can be constructed between the two temperature scales. The point K is arranged to travel along such a curve and with the proportions illustrated it is found that the correct curve is a circular arc with center L and radius LK.

Now it will be seen that if both thermometers are at the same temperature and are then heated or cooled the same amount, the position of the point K will not alter in changing from one temperature to another, since that point at 100% humidity is half-way between the two vertical grooves and since the movement of the tape E will be compensated by an equal and opposite movement of the tape G.

It will be seen from the above description that the improved instrument is based upon the form of diagram known as the "nomogram" or "alignment chart" which is used by laying a straight edge across two scales representing variables and reading the intersection upon a third scale.

The link J need not be rigid and could be replaced by a cord stretched between the points F and H and the reading could be given by the intersection of this cord upon a curve.

While the foregoing description is drawn in terms of thermometers giving a purely linear indication, the invention is also applicable to thermometers in which logarithmic or vapour pressure scales are used. In these it will be necessary to make arrangements for the point K to travel over the appropriate curve such as by constraining it to move in an appropriate cam slot.

I claim:—

1. A direct reading hygrometer comprising a dry bulb thermometer, a guide, a member moving in said guide, means to cause said member to move by amounts which are functions of the dry bulb temperature, a wet bulb thermometer, a second guide, a member moving in said second guide, means for causing said second moving member to move by amounts which are functions of the wet bulb temperature and in a direction which is opposite to that in which said first moving member is caused to move for a change of temperature of the same sign, a curved guideway, a link connecting said moving members and intersecting said curved guideway, means movable along said guideway by said link, and a humidity indicator actuated by said last named means.

2. A direct reading hygrometer as claimed in claim 1, wherein the guides are straight and the moving members are caused to move in them by amounts which bear linear relations to the temperatures of the dry and wet bulbs respectively.

3. A direct reading hygrometer as claimed in claim 1, wherein there is provided an indicating pointer and a pivoted arm connected thereto, and means for causing said pivoted arm to move so that a point thereon coincides with the point of intersection of the link and the curve.

4. A direct reading hygrometer having a dry bulb thermometer, a straight guide, a slide moving in said guide, means to cause said slide to move by amounts which are functions of the dry bulb temperature, a wet bulb thermometer, a straight guide parallel to said first guide, a slide moving in said second guide, means for causing said second slide to move by amounts which are functions of the wet bulb temperature and in a direction opposite to that in which said first slide is caused to move for a temperature change of the same sign, a pivoted arm, a humidity scale, a pointer moving over said humidity scale and connected to said pivoted arm, and a link connecting said moving slides and pivoted at an intermediate point to said pivoted arm.

In testimony whereof I have signed my name to this specification.

RICHARD GORDON BATESON.